United States Patent
Yang et al.

(10) Patent No.: US 10,015,790 B2
(45) Date of Patent: Jul. 3, 2018

(54) METHOD AND DEVICE FOR TRANSMITTING/RECEIVING RADIO SIGNAL IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 15/305,632

(22) PCT Filed: Apr. 27, 2015

(86) PCT No.: PCT/KR2015/004188
§ 371 (c)(1),
(2) Date: Oct. 20, 2016

(87) PCT Pub. No.: WO2015/163748
PCT Pub. Date: Oct. 29, 2015

(65) Prior Publication Data
US 2017/0048851 A1    Feb. 16, 2017

Related U.S. Application Data

(60) Provisional application No. 61/984,056, filed on Apr. 25, 2014.

(51) Int. Cl.
*H04W 72/04*   (2009.01)
*H04W 52/04*   (2009.01)
(Continued)

(52) U.S. Cl.
CPC .......... *H04W 72/0446* (2013.01); *H04L 1/00* (2013.01); *H04W 52/04* (2013.01); *H04W 52/36* (2013.01); *H04W 72/02* (2013.01); *H04W 72/042* (2013.01)

(58) Field of Classification Search
CPC ................................................ H04W 72/0446
See application file for complete search history.

(56) References Cited

U.S. PATENT DOCUMENTS 9,270,423 B2 *   2/2016   Fang ..................... H04L 1/1607
9,681,394 B2 *   6/2017   Huang ................ H04W 52/241
(Continued)

FOREIGN PATENT DOCUMENTS

| EP | 2086266 | 8/2009 |
|---|---|---|
| KR | 1020140043494 | 4/2014 |
| WO | 2013048570 | 4/2013 |

OTHER PUBLICATIONS

PCT International Application No. PCT/KR2015/004188, Written Opinion of the International Searching Authority dated Aug. 13, 2015, 21 pages.
(Continued)

*Primary Examiner* — Parth Patel
(74) *Attorney, Agent, or Firm* — Lee, Hong, Degerman, Kang & Waimey PC (57) ABSTRACT

The present invention relates to a wireless communication system, and, particularly, to a method and a device therefor, the method comprising the steps of: receiving first uplink resource allocation information from a base station, wherein the first uplink resource allocation information includes information indicating a subframe set and TPC range indicating information; transmitting second uplink resource allocation information to the base station, wherein the second uplink resource allocation information includes a TPC value selected by a user equipment in the TPC range
(Continued)

determined on the basis of the TPC range indicating information; and transmitting uplink data to the base station in the subframe set, wherein the transmission power for the uplink data is set on the basis of the TPC value, the subframe set includes multiple subframe groups, and the TPC range is changed in a unit of subframe groups according to the predefined pattern.

10 Claims, 8 Drawing Sheets

(51) Int. Cl.
  *H04W 52/36* (2009.01)
  *H04L 1/00* (2006.01)
  *H04W 72/02* (2009.01)

(56) References Cited

U.S. PATENT DOCUMENTS

| | | | | |
|---|---|---|---|---|
| 2004/0203397 A1* | 10/2004 | Yoon | H04B 1/7097 | 455/63.1 |
| 2008/0056177 A1* | 3/2008 | Mori | H04W 52/04 | 370/318 |
| 2011/0039568 A1* | 2/2011 | Zhang | H04W 52/50 | 455/452.1 |
| 2011/0105050 A1* | 5/2011 | Khandekar | H04L 5/001 | 455/68 |
| 2011/0176498 A1* | 7/2011 | Montojo | H04W 52/325 | 370/329 |
| 2011/0243008 A1* | 10/2011 | Kim | H04L 1/1893 | 370/252 |
| 2012/0008589 A1* | 1/2012 | Iwai | H04B 1/713 | 370/329 |
| 2012/0320805 A1* | 12/2012 | Yang | H04L 1/18 | 370/280 |
| 2013/0010720 A1* | 1/2013 | Lohr | H04L 1/0026 | 370/329 |
| 2013/0039286 A1* | 2/2013 | Larsson | H04W 52/146 | 370/329 |
| 2013/0044720 A1* | 2/2013 | Nakao | H04L 5/001 | 370/329 |
| 2013/0100842 A1* | 4/2013 | Nishikawa | H04W 52/146 | 370/252 |
| 2013/0114562 A1* | 5/2013 | Seo | H04W 52/146 | 370/329 |
| 2013/0195031 A1* | 8/2013 | Hessler | H04L 1/1819 | 370/329 |
| 2013/0258926 A1* | 10/2013 | Osakada | H04W 52/04 | 370/311 |
| 2013/0308612 A1* | 11/2013 | Cai | H04L 1/0028 | 370/336 |
| 2014/0119220 A1* | 5/2014 | Wang | H04W 52/244 | 370/252 |
| 2014/0161003 A1* | 6/2014 | Han | H04W 52/146 | 370/280 |
| 2014/0185591 A1* | 7/2014 | Chizgi | H04B 1/7117 | 370/336 |
| 2014/0198733 A1* | 7/2014 | Yin | H04W 72/0446 | 370/329 |
| 2014/0307652 A1* | 10/2014 | Zhang | H04W 52/325 | 370/329 |
| 2015/0043465 A1* | 2/2015 | Ouchi | H04W 16/28 | 370/329 |
| 2015/0085797 A1* | 3/2015 | Ji | H04J 3/16 | 370/329 |
| 2015/0105119 A1* | 4/2015 | Eriksson | H04W 52/146 | 455/522 |
| 2015/0110023 A1* | 4/2015 | Pan | H04W 52/244 | 370/329 |
| 2015/0117272 A1* | 4/2015 | Gao | H04L 1/1861 | 370/280 |
| 2015/0195019 A1* | 7/2015 | Nagata | H04B 7/0413 | 375/267 |
| 2015/0351040 A1* | 12/2015 | Park | H04W 72/042 | 370/280 |
| 2016/0029239 A1* | 1/2016 | Sadeghi | H04W 52/244 | 370/252 |
| 2016/0066282 A1* | 3/2016 | Ouchi | H04L 5/00 | 455/522 |
| 2016/0066288 A1* | 3/2016 | Feng | H04W 52/54 | 370/280 |
| 2016/0135147 A1* | 5/2016 | Ouchi | H04W 52/146 | 370/329 |
| 2016/0135200 A1* | 5/2016 | Brahmi | H04W 4/06 | 370/329 |
| 2016/0149672 A1* | 5/2016 | Shimezawa | H04L 1/1812 | 370/329 |
| 2016/0150490 A1* | 5/2016 | Ouchi | H04W 72/12 | 455/522 |
| 2016/0150562 A1* | 5/2016 | Nakamura | H04L 1/0061 | 370/329 |
| 2016/0165545 A1* | 6/2016 | Ouchi | H04W 52/146 | 455/522 |
| 2016/0165547 A1* | 6/2016 | Ouchi | H04W 52/146 | 455/522 |
| 2016/0234833 A1* | 8/2016 | Shimezawa | H04W 72/04 | |
| 2016/0234860 A1* | 8/2016 | Shimezawa | H04L 1/0026 | |
| 2016/0337110 A1* | 11/2016 | Yang | H04L 1/1854 | |
| 2017/0034787 A1* | 2/2017 | Chen | H04W 52/146 | |
| 2017/0048851 A1* | 2/2017 | Yang | H04W 52/04 | |
| 2017/0347382 A1* | 11/2017 | Ji | H04L 5/0094 | |

OTHER PUBLICATIONS

Sharp, "Separate TPC command and accumulation for enhanced UL PC", R1-133225, 3GPP TSG RAN WG1 Meeting #74, Aug. 10, 2013, 4 pages.

* cited by examiner

PUCCH format 2,2a and 2b structure (normal CP case)

METHOD AND DEVICE FOR TRANSMITTING/RECEIVING RADIO SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2015/004188, filed on Apr. 27, 2015, which claims the benefit of U.S. Provisional Application No. 61/984,056, filed on Apr. 25, 2014, the contents of which are all hereby incorporated by reference herein in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Task

The technical task of the present invention is to provide a method of efficiently performing a process of transmitting/receiving a wireless signal and apparatus for the same.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of transmitting an uplink signal to a base station by a user equipment in a wireless communication system, including: receiving first uplink resource allocation information from the base station wherein the first uplink resource includes information indicating a subframe set and TPC (Transport Power Control) range indication information; transmitting second uplink resource allocation information to the base station wherein the second uplink resource allocation information comprises a TPC value selected by the user equipment in a TPC range determined based on the TPC range indication information; and transmitting uplink data within the subframe set to the base station, wherein transmission power of the uplink data is set based on the TPC value, wherein the subframe set comprises a plurality of subframe groups, and wherein the TPC range is changed by subframe group units according to a predefined pattern.

In another technical aspect of the present invention, provided herein a user equipment configured to transmit an uplink signal to a base station in a wireless communication system, including: an RF (Radio Frequency) module; and a processor configured to receive first uplink resource allocation information from the base station, wherein the first uplink resource comprises information indicating a subframe set and TPC (Transport Power Control) range indication information, the processor configured to transmit second uplink resource allocation information to the base station, wherein the second uplink resource allocation information comprises a TPC value selected by the user equipment in a TPC range determined based on the TPC range indication information, the processor configured to transmit uplink data within the subframe set to the base station, wherein transmission power of the uplink data is set based on the TPC value, wherein the subframe set comprises a plurality of subframe groups, and wherein the TPC range is changed by subframe group units according to a predefined pattern.

The first uplink resource allocation information may further include CS (Cyclic Shift) indication information for transmission of a reference signal used for demodulation of the uplink data and the second uplink resource allocation information may further include an MCS (Modulation and Coding Scheme) index and a TBS (Transport Block Size) index selected by the user equipment.

The uplink resource allocation information may further include an MCS index and the second uplink resource allocation information may further include a TBS index selected by the user equipment.

The first uplink resource allocation information may further include TBS range indication information and the TBS index within the second uplink resource allocation information may be selected by the user equipment in a TBS range determined based on the indication information.

The first uplink resource allocation information may be transmitted through a PDCCH (Physical Downlink Control Channel) or a PDSCH (Physical Downlink Shared Channel) and the second uplink resource allocation information may be transmitted through a PUCCH (Physical Uplink Control Channel) or a PUSCH (Physical Uplink Shared Channel).

Advantageous Effects

According to the present invention, in a wireless communication system, wireless signal transmission/reception can be efficiently performed.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
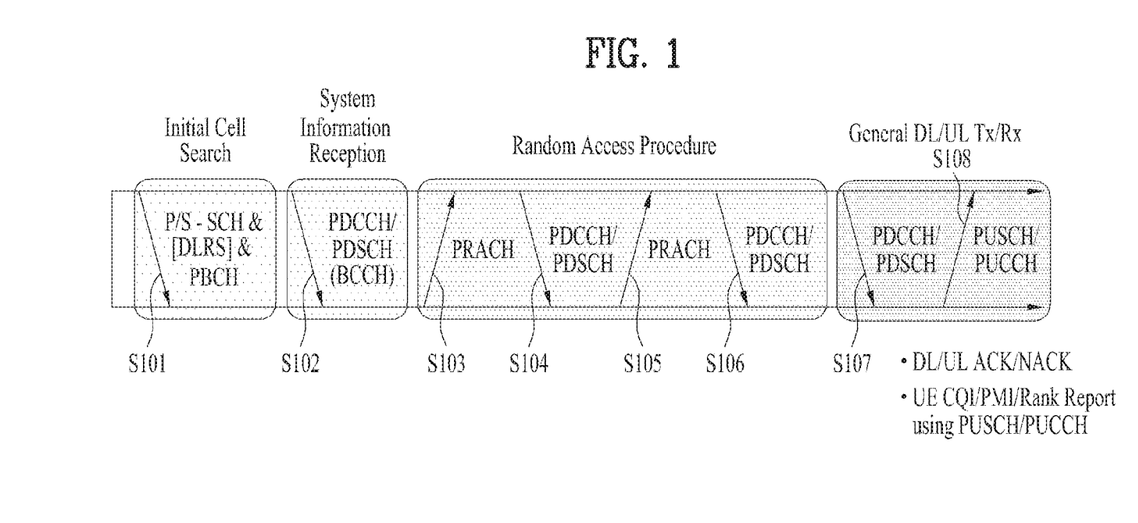
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
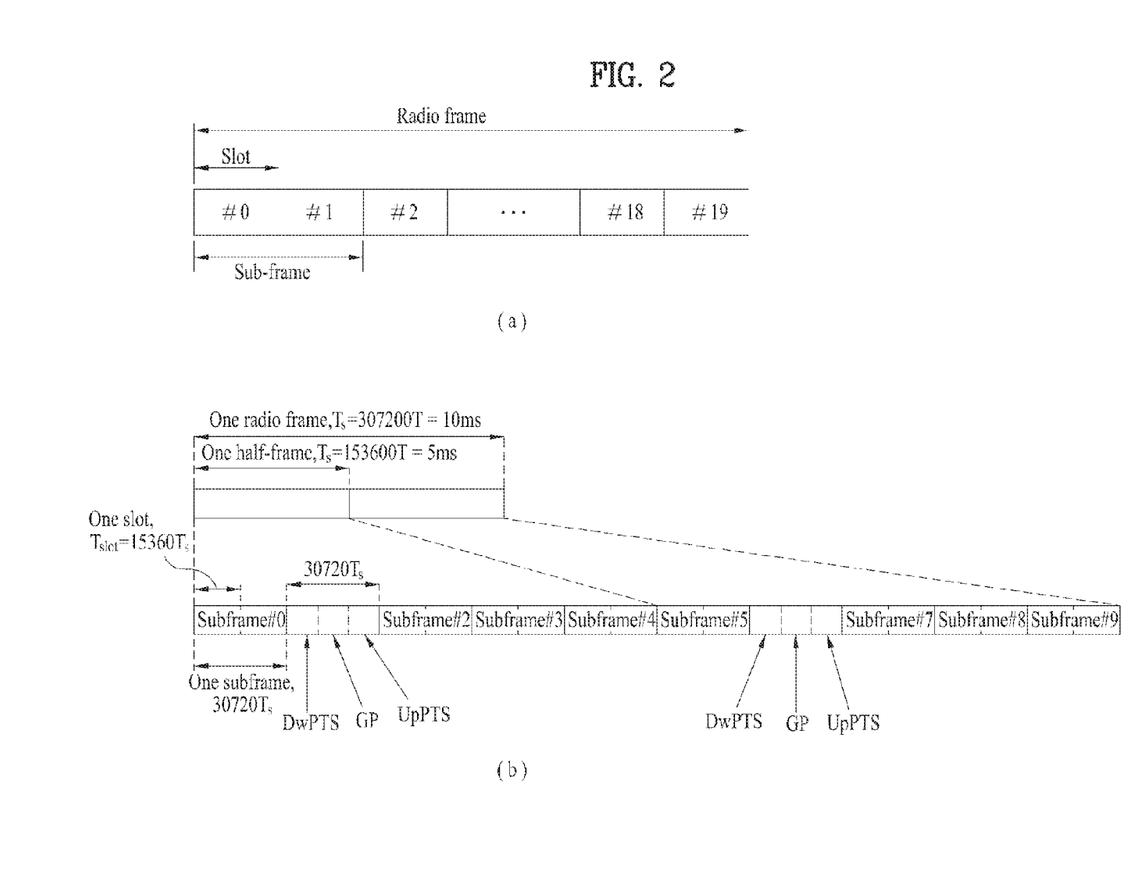
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
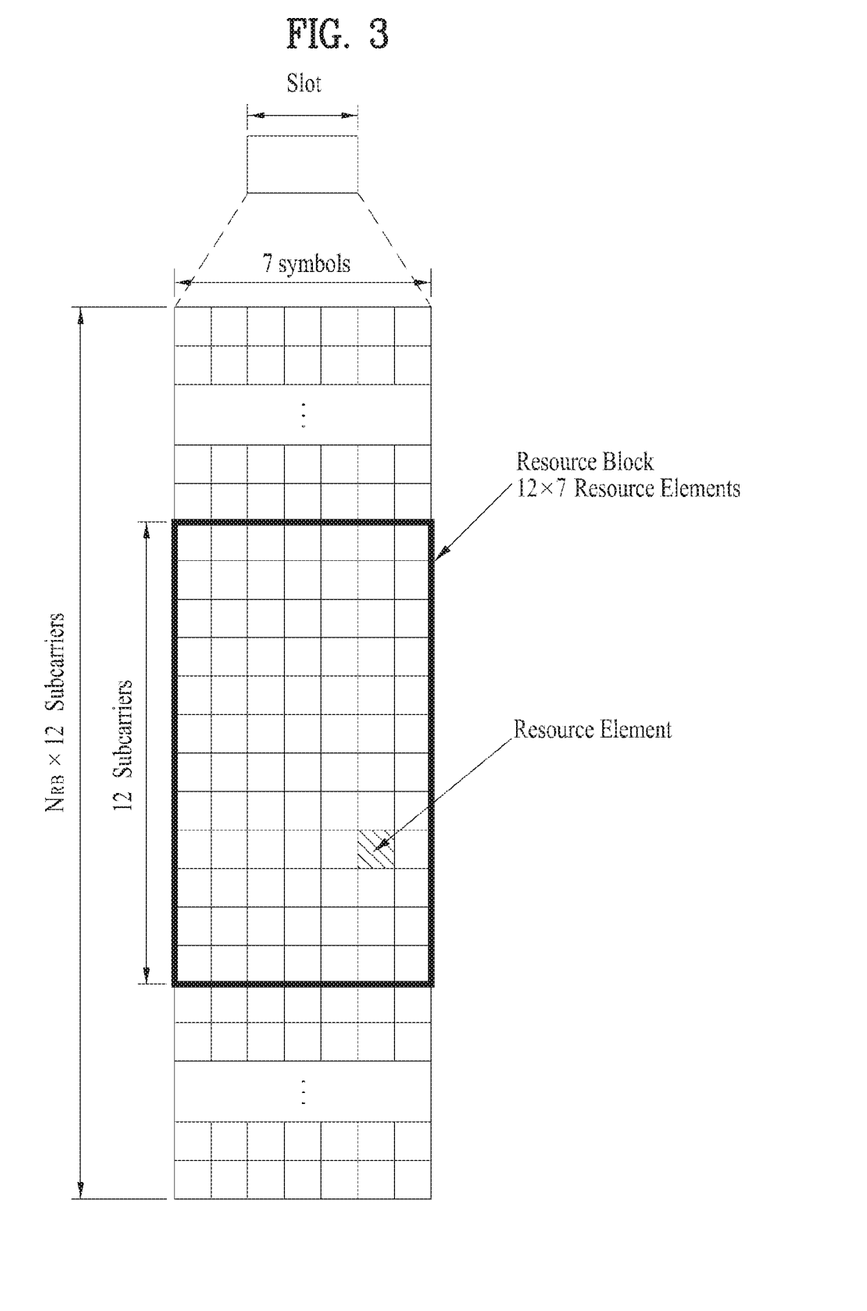
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
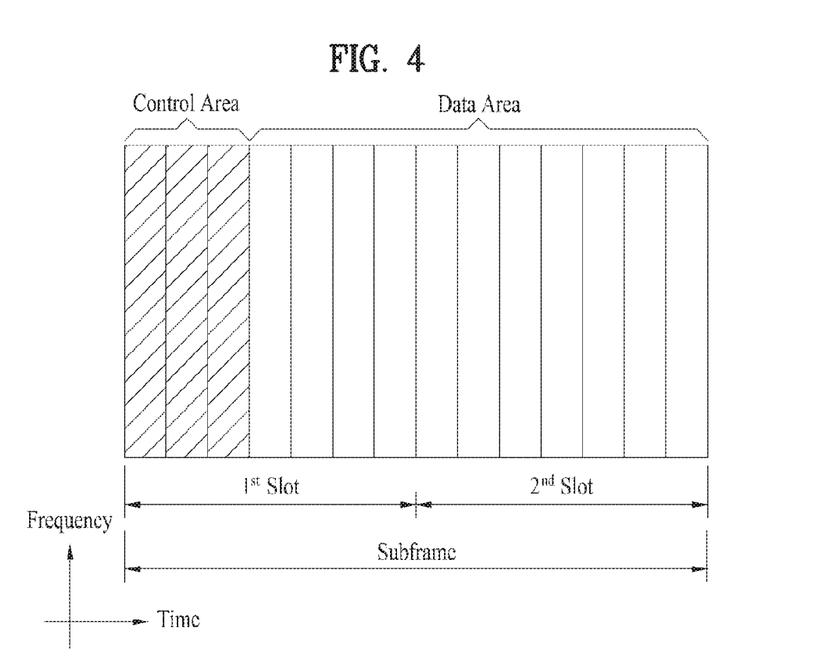
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an uplink subframe structure.

Figure 5:
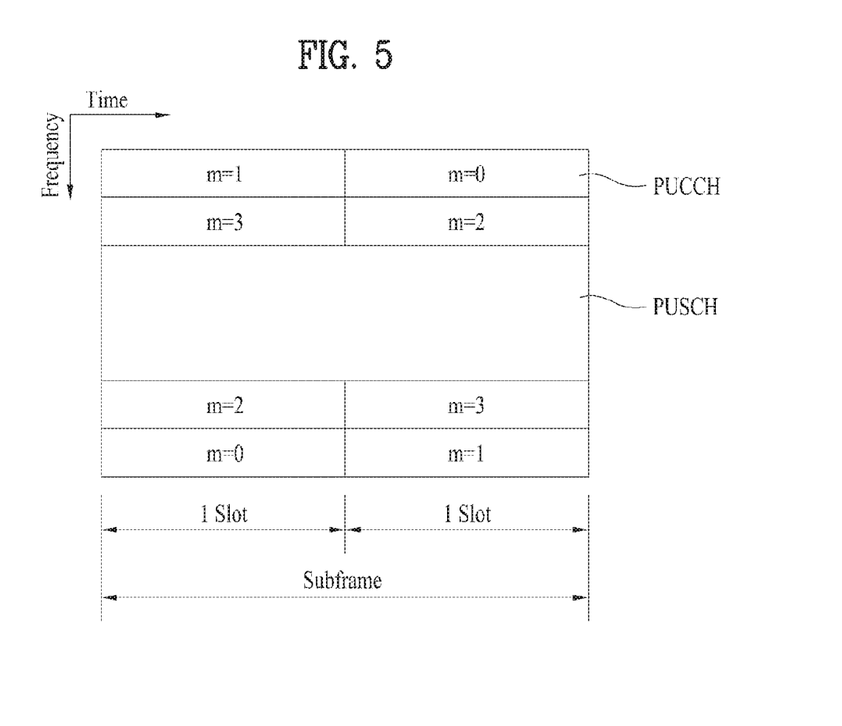
FIG. 5 illustrates the structure of an uplink subframe.

Referring to FIG. 5, an uplink subframe includes a plurality of (e.g. 2) slots. A slot may include different numbers of SC-FDMA symbols according to CP lengths. For example, a slot may include 7 SC-FDMA symbols in a normal CP case. The uplink subframe is divided into a control region and a data region in the frequency domain. The data region is allocated with a PUSCH and used to carry a data signal such as audio data. The control region is allocated a PUCCH and used to carry control information. The PUCCH includes an RB pair (e.g. m=0, 1, 2, 3) located at both ends of the data region in the frequency domain and hopped in a slot boundary. Control information includes HARQ ACK/NACK, CQI, PMI, RI, etc.

Figure 6:
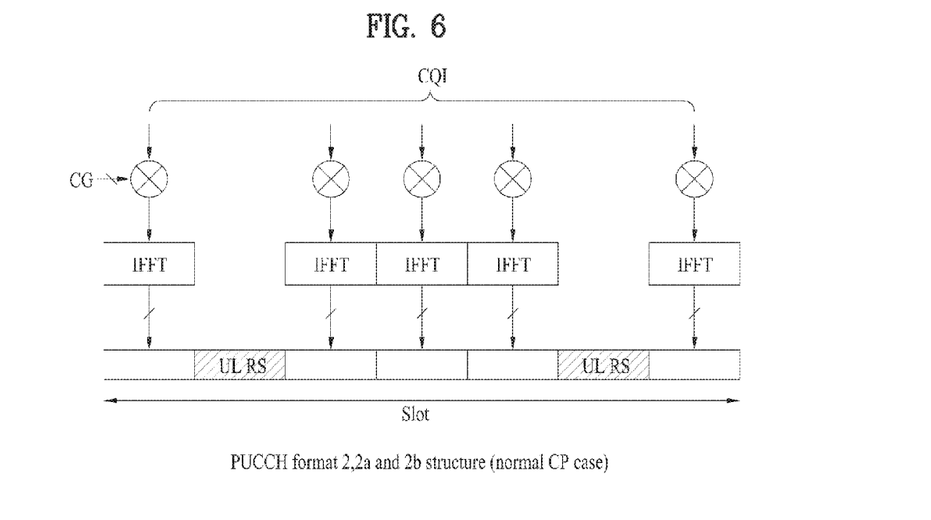
FIG. 6 illustrates PUCCH formats 2/2a/2b in case of normal CP.

FIG. 6 illustrates PUCCH formats 2/2a/2b in case of normal CP.

Referring to FIG. 6, one subframe includes 10 QPSK data symbols in addition to RS symbols in case of normal CP. Each of the QPSK symbols is spread in the frequency domain by CS and then mapped to the corresponding SC-FDMA symbol. SC-FDMA symbol level CS hopping may be applied to randomize inter-cell interference. An RS may be multiplexed by CDM using CSs. For example, if the number of available CSs is 12 or 6, 12 or 6 UEs can be multiplexed in the same PRB. That is, a plurality of UEs can be multiplexed by CS+PRB in PUCCH formats 2/2a/2b.

Figure 7:
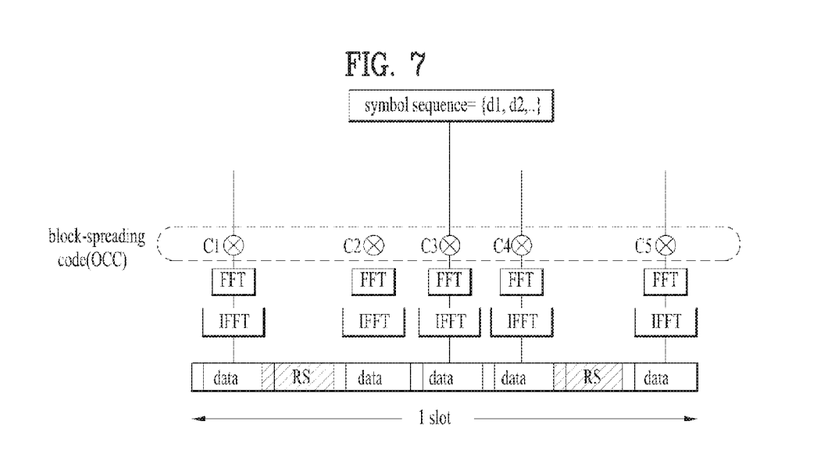
FIG. 7 illustrates a slot level PUCCH format 3 structure.

FIG. 7 illustrates slot level PUCCH format 3.

Referring to FIG. 7, control information is transmitted by block-spreading and SC-FDMA modulation. The SC-FDMA modulation includes FFT (Fast Fourier Transform) and IFFT (Inverse FFT). Specifically, a symbol sequence is transmitted across the frequency domain and OCC (orthogonal cover code) based time-domain spreading applies to the symbol sequence. Control signals of a plurality of UEs can be multiplexed with the same RB using OCC. 5 SC-FDMA symbols (i.e. UCI data parts) are generated from one symbol sequence {d1, d2, . . . ,} in case of using a length-5 OCC (C1 to C5). The symbol sequence {d1, d2, . . . } may mean a modulation symbol sequence or a codeword bit sequence. 24 modulation symbols may be transmitted in the subframe.

Figure 8:
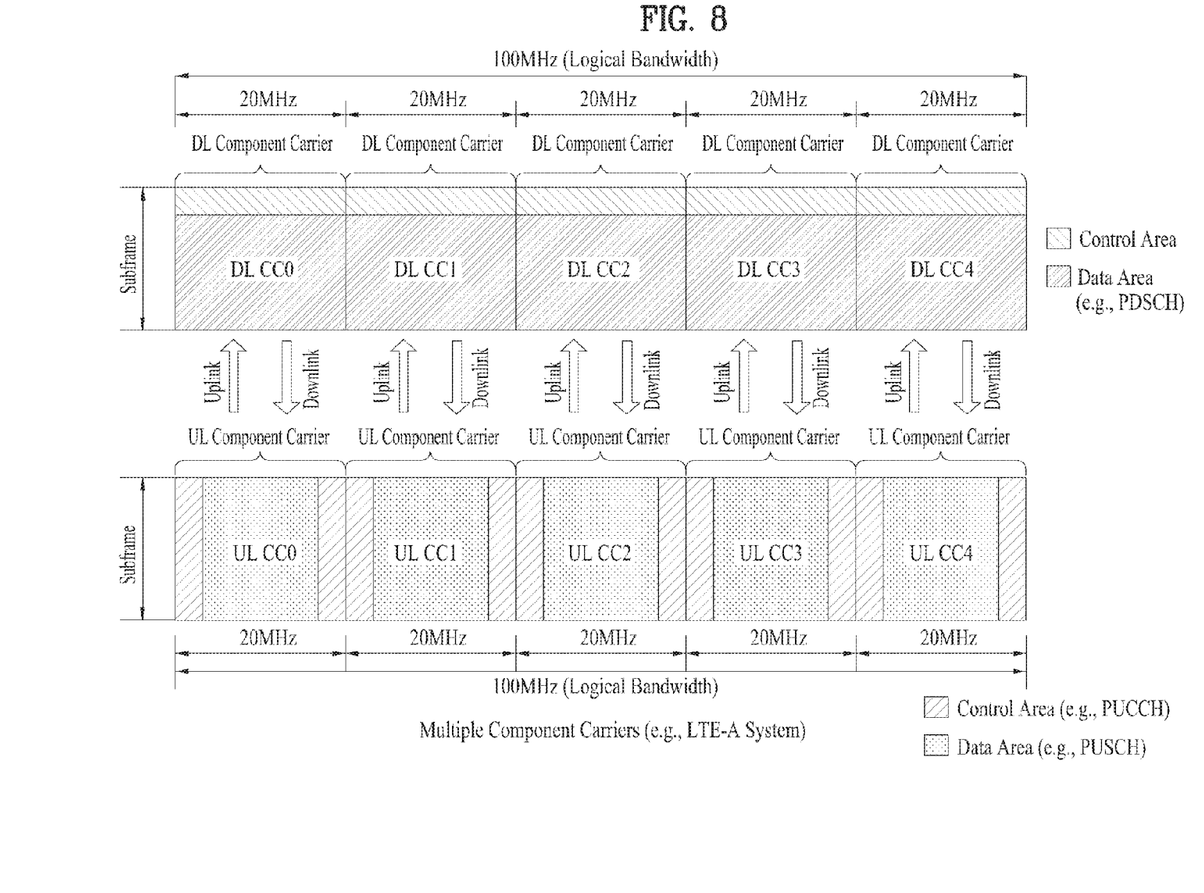
FIG. 8 illustrates a carrier aggregation (CA)-based wireless communication system.

FIG. 8 illustrates carrier aggregation (CA) communication system.

Referring to FIG. 8, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
    No CIF
  CIF enabled: a PDCCH on a DL CC can be used to allocate a PDSCH or PUSCH resource on a specific DL/UL CC from among a plurality of aggregated DL/UL CCs using the CIF.
    LTE DCI format extended to have CIF
      CIF corresponds to a fixed x-bit field (e.g. x=3) (when CIF is set)
      CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 9:
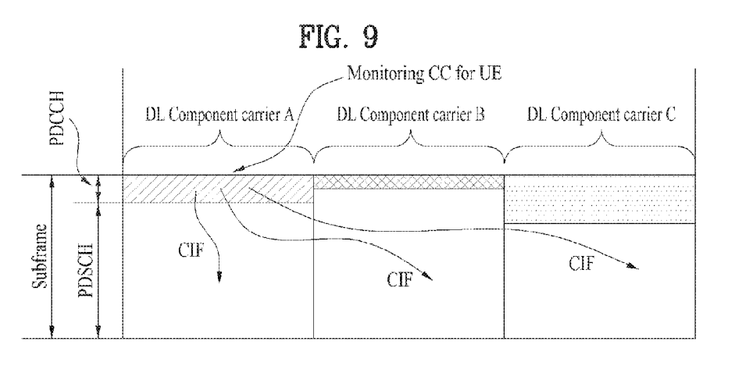
FIG. 9 illustrates a cross-carrier scheduling.

FIG. 9 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Embodiment: UE-Driven Scheduling

Figure 10:
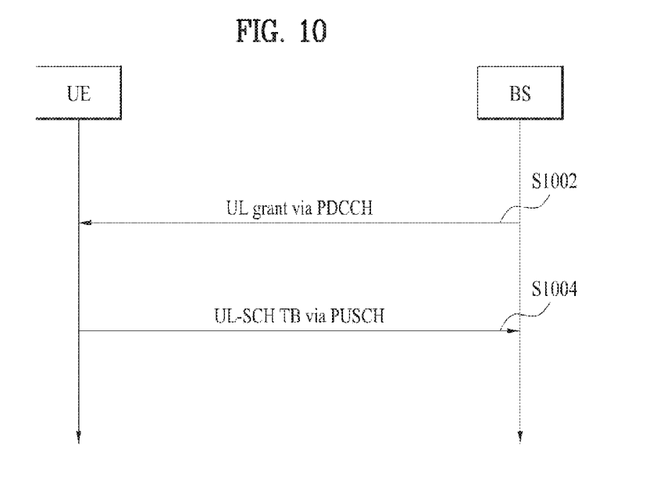
FIG. 10 illustrates the existing UL (Uplink) scheduling process.

FIG. 10 illustrates an example of a UL scheduling process according to a related art. Referring to FIG. 10, in the existing system including LTE, UL data scheduling is performed in a manner as follows. 1) A base station (BS) transmits UL grant DCI including information/parameter to be used for UL data transmission to a user equipment (UE) in SF (subframe) #n (S1002). 2) Thereafter, the UE transmits UL data to the BS in SF #(n+k) by applying information/parameter included in the UL grant DCI (S1004). UL data includes UL-SCH (Shared Channel) TB (Transport Block).

UL data transmission-related information/parameter included in the UL grant may include RA (Resource Allocation) information, MCS/TBS (Modulation and Coding Scheme/Transport Block Size) index, DMRS (Demodulation Reference Signal) cyclic shift value, TPC (Transmit Power Control) command and the like. An SF offset K may have a value equal to or greater than 4. In other words, in the existing scheme, the resource region used for UL data transmission and all informations/parameters required for signal configuration are determined by the BS and directed to the UE. Further, the UE simply performs UL data transmission only to meet the corresponding information/parameter (for clarity, the existing scheme is called "eNB-driven" scheduling).

Table 4 illustrates information included in the existing UL grant DCI. DCI format 0 is UL grant and DCI format 1A is DL grant, which are distinguished by a flag value.

TABLE 4

| | Information Field | bit(s) |
|---|---|---|
| (1) | Flag for format0/format1A differentiation | 1 |
| (2) | Hopping flag | 1 |
| (3) | Resource block assignment and hopping resource Allocation | Variable depending on BW |
| (4) | Modulation and coding scheme and redundancy Version | 5 |
| (5) | New data indicator | 1 |
| (6) | TPC command for scheduled PUSCH | 2 |
| (7) | Cyclic shift for DM RS | 3 |
| (8) | UL index (TDD) | 2 |
| (9) | CQI request | 1 |

Table 5 shows UAI (Uplink Association Index) for the existing PUSCH transmission. If PHICH/UL grant is detected in subframe #n, the UE can transmit PUSCH in subframe #n+k.

TABLE 5

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

Meanwhile, in the next generation system after LTE, when a UE performs UL transmission, it may be inevitable for the UE to reduce the transmission power of a specific cell or a specific UL signal/channel or abandon/omit the transmission at all depending on a communication situation. For example, a plurality of cells may be carrier-aggregated (CA) for one UE. In this case, CA cells may belong to different frequency bands, have different UL transmission timings (e.g., a TA value), or belong to different BSs (cell group corresponding thereto). In such a situation, the operation of performing simultaneous transmission of a plurality of UL signals/channels through a plurality of cells at a specific timing may be required of the UE. In this case, it may be inevitable to reduce the transmission power of a specific cell or a specific UL signal/channel or abandon/omit the transmission depending on the combination of UL signals/channels among a plurality of cells, whether a plurality of UL signals/channels overlap each other, independent UL scheduling for each BS (cell group), combination of MCS level and RA region designated/directed by the BS, UL transmission power control from the BS, the maximum UL transmission power restriction in the UE and the like.

In order to solve such a problem, a UL data scheduling method of a UE-driven scheme for a more stable and effective UL transmission signal processing in a UL situation is proposed. The present invention may be useful for the CA structure, by which the present invention is non-limited.

Figure 11:
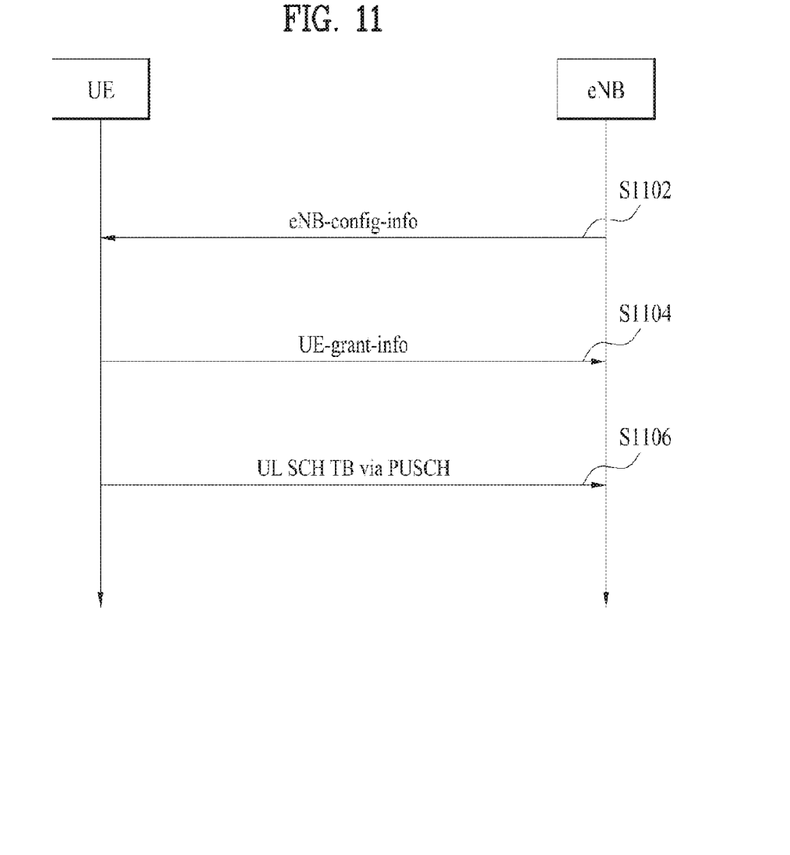
FIG. 11 illustrates an UL scheduling process according to the present invention.

FIG. 11 illustrates an UL scheduling process according to the present invention. Referring to FIG. 11, a basic UL scheduling process can be performed as follows.

1) A specific portion (hereinafter "eNB-config-info") of information/parameter to be used for UL data transmission (e.g., see Table 4) may be set for a UE in advance by a BS (S1102). For example, the eNB-config-info may include SF (hereinafter "UE-driven-SF") allocation information allowing UE-driven scheduling or information corresponding to the SF allocation information and/or TPC command-related information (hereinafter "TPC-command-info") applied to UL data (and/or UL grant DCI) transmission. The eNB-config-info may be set to be semi-static through RRC (Radio Resource Control) message. Furthermore, the eNB-config-info may be transmitted through PDCCH or PDSCH.

2) Subsequently, the UE can UL-transmit UL grant DCI including a whole or specific portion of the rest of UL data transmission related information/parameters (hereinafter "UE-grant-info") to the BS in SF #m (S1104). The UE-grant-info may include RA information (hereinafter "actual-UL-RA") used for actual UL data transmission.

3) Thereafter, the UE can UL-transmit UL data (e.g., UL-SCH-TB) corresponding to the information/parameter to the BS in SF #(m+h) (S1106). SF offset h may be designated/set to a value equal to or greater than 0.

The aforementioned TPC-command-info may be configured with 1) the TCP command value applied to the transmission of the actual UL data (and/or UL grant DCI) or 2) the range information of the UL transmission power applicable (or application-allowable) to the transmission of UL data (and/or UL grant DCI). In case of the 2), the actual UL data (and/or UL grant DCI) transmission power determined by the UE can be restricted to be selected as a value within the UL-power-range set by the BS. Further, the eNB-config-info may further include RA information (hereinafter "coarse-UL-RA") usable (or use-allowable) for the UL data transmission. In this case, the actual-UL-RA region determined by the UE may be restricted to be configured with only the resource belonging to the coarse-UL-RA set by the BS.

Furthermore, the UL signal/channel carrying UL grant DCI including UE-grant-info can be configured/transmitted in the form of the existing PUCCH carrying UCI (e.g., PUCCH format 2 or 3 group allowing multi-bit payload configuration) (see FIG. 6 and FIG. 7) or PUSCH carrying UL data (or a modified form thereof). When the e-grant-info is transmitted through PUCCH, the resource required for PUCCH transmission may be designated to the UE by the BS in advance. For example, the PUCCH resource index used for PUCCH transmission may be designated in advance. Further, (in a state that only RB index has been designated in advance), CS, OCC and the like used for PUCCH transmission may be UE-specifically configured by the UE ID. Further, when UE-grant-info is transmitted through PUSCH, RB index, MCS level and DMRS cyclic shift value used for PUSCH transmission may be designated to the UE by the BS in advance. Further, (in a state that only MCS level has been designated in advance) RB index, DMRS cyclic shift value and the like used for PUSCH transmission may be UE-specifically configured by the UE ID.

UL grant DCI and UL data corresponding thereto may be transmitted through UL SF of the same cell, or transmitted through UL SFs of different cells, respectively. Further, one common UE-driven-SF (set) may be configured for UL grant DCI transmission and UL data transmission, or UE-driven-SF (set) may be independently configured for each of the UL grant DCI transmission and the UL data transmission.

Meanwhile, one common TPC-command-info may be set/applied for all UE-driven-SFs (sets), or independent TPC-command-info may be set/applied for each UE-driven-SF (set). Further, TCP-command-info may be set/applied in common for UL grant DCI transmission and UL data transmission, or may be independently set/applied for each of the UL grant DCI transmission and the UL data transmission.

According to the proposed method, the UE may perform UL grant DCI and/or corresponding UL data transmission through UL of SF selected by the UE from UE-driven-SFs (and/or coarse-UL-RA) configured by the BS (and actual-UL-RA region determined by the UE).

In addition to UE-driven-SF, TPC-command-info, coarse-UL-RA and actual UL-RA, examples of possible combinations of eNB-config-info and UE-grant-info are described as follows.

1) Method 1
A. eNB-config-info: DMRS cyclic shift, MCS/TBS index
B. UE-grant-info: none
2) Method 2
A. eNB-config-info: DMRS cyclic shift
B. UE-grant-info: MCS/TBS index
3) Method 3
A. eNB-config-info: MCS/TBS index
B. UE-grant-info: DRMS cyclic shift
4) Method 4
A. eNB-config-info: none
B. UE-grant-info: DMRS cyclic shift, MCS/TBS index In addition, the following combinations of configuring MCS by the BS and selecting TBS by the UE in a manner of separating a subject selecting MCS and a subject selecting TBS from each other are possible.

5) Method 5
A. eNB-config-info: MCS index, DMRS cyclic shift
B. UE-grant-info: TBS index
6) Method 6
A. eNB-config-info: MCS index
B. UE-grant-info: TBS index, DMRS cyclic shift When the DMRS cyclic shift is included in UE-grant-info, the type/range information (hereinafter "DMRS-CS-range") of the DMRS cyclic shift value applicable to the UL data transmission may be further included in the eNB-config-info. In this case, the DMRS cyclic shift value determined by the UE may be restricted to be selected within only the value belonging to the DMRS-CS-range configured by the BS. Similarly, when MCS/TBS index is included in the UE-grant-info, the type/range information (hereinafter "MCS-index-range") of the MCS/TBS index value applicable (or application-allowed) to the UL data transmission may be further included in the eNB-config-info. In this case, the MCS/TBS index value may be restricted to be selected within only the value belonging to the MCS-index-range configured by the BS.

Further, in case of eNB-config-info (e.g., TPC-command-info such as coarse-UL-RA and/or DMRS-CS-range and/or UL-power-range) configured by the BS, 1) it may be configured to be the same throughout the entire UE-driven-SF, 2) it may be configured per SF or SF group that configures UE-driven-SF, or 3) it may be configured to be changed (e.g., hopped) by SF (group) unit with a pre-designated pattern.

Further, the UE enables UL SF-related information, which is used for UL data transmission of the UE among UE-driven-SFs configured by the BS, to be included in the UE-grant-info. Further, the UE enables DMRS CS information, which is used for UL data transmission of the UE within the DMRS-CS-range configured by the BS, to be included in the UE-grant-info. Further, the UE enables TPC information, which is used for the UL data transmission of the UE within the UL-power-range configured by the BS, to be included in the UE-grant-info. Further, the UE enables MCS/TBS information, which is used for the UL data transmission of the UE within the MCS-index-range configured by the BS, to be included in the UE-grant-info.

Meanwhile, NDI may be included in the UE-grant-info transmitted to the BS by the UE. Further, the BS may signal the NDI to the UE by allocating/using a specific PHICH resource or through a specific PDCCH format. A scheme such as a DCI format 3/3A form may be considered as an example of a specific PDCCH. Particularly, a specific bit index within the corresponding DCI may be assigned for the purpose of NDC signaling to the corresponding UE. To this end, a new RNTI (e.g., NDI-RNTI) may be applied, instead of the existing TPC-PUCCH-RNTI or TPC-PUSCH-RNTI, to DCI format 3/3A. Namely, when TPC-PUCCH-RNTI or TPC-PUSCH-RNTI is applied to DCI format 3/3A, the specific bit index within the DCI may be used for the purpose of TPC signaling to the corresponding UE. And, when NDI-RNTO is applied to DCI format 3/3A, the specific bit index within the DCI may be used for the purpose of NDI signaling to the corresponding UE. TPC-PUCCH-RNTI, TPC-PUSCH-RNTI and NDI-RNTI may be assigned per UE-group. Further, the scheme of configuring/selecting a different UE-driven-SF may be considered depending on whether there is a toggle of NDI (in case of transmitting UE-grant-info and/or UL data).

Meanwhile, in case of retransmission of (initial transmission) UL data to which the UE-driven scheduling scheme is applied, the following schemes can be considered.

1) The existing BS-driven scheduling scheme may apply based on the existing HARQ timeline (e.g., UL grant-to-PUSCH timing, PUSCH-to-PHICH timing and PUSCH-to-PUSCH timing). Namely, the UE-driven scheduling scheme can apply to initial transmission of UL data and the exiting BS-driven scheduling scheme can apply to UL data retransmission. In this case, the UL data retransmission may be performed by a non-adaptive scheme using PHICH or by an adaptive scheme using UL grant PDCCH.

According to the existing HARQ timeline, if there is PUSCH transmission in subframe #n, the UE receives a corresponding PHICH in subframe #(n+$k_{PHICH}$). The $k_{PHICH}$ has a fixed value (e.g., 4) in FDD and is given according to UL-DL configuration in TDD as Table 6.

TABLE 6

| TDD UL-DL | UL subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Further, if PHICH/UL grant is detected in subframe n, the UE transmits PUSCH in subframe n+k. The k has a fixed value (e.g., 4) in FDD and is given according to UL-DL configuration in TDD as Table 7.

TABLE 7

| TDD UL-DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 4 | 6 | | | 4 | 6 | | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

2) UL data retransmission may be performed according to the BS-driven scheduling scheme using UE-driven-SF only. Therefore, with respect to the initial transmission of UL data, when NACK is received through PHICH, the UE may perform only the adaptive retransmission based on the UE-to-BS UL grant on the UE-driven-SF without performing automatic retransmission. Therefore, when PHICH (NACK) is received in subframe #n, the UE operation varies depending on what scheme is used for the initial transmission of the UL data.

Case of applying BS-driven scheduling scheme: PUSCH retransmission is performed in subframe #n+k. If subframe #n+k is set as UE-driven SF, the UE may abandon PUSCH retransmission in subframe #n+k.

Case of applying UE-driven-scheduling scheme: PUSCH retransmission is performed in UE-driven-SF after subframe #n+k based on the UE-to-BS UL grant.

Meanwhile, in order to maintain UL-synchronous HAQR process, the UE-driven-SF can be configured with only an SF set having an interval of the existing PUSCH-to-PUSCH round trip time (e.g., FDD: 8 ms or SFs, TDD: 10 ms or SFs) or a combination thereof. To this end, the UE-driven-SF set may be configured to have a pattern repeated with the multiple of, for example, 8 ms (or SF) (FDD) or 10 ms (or SF) (TDD). For example, the UE-driven-SF allocation information may be configured with an 8-bit bitmap (FDD) or a 10-bit bitmap (TDD).

Additionally, a principle similar to the proposed method is also applicable to DL data scheduling. Particularly, 1) in a state that the UE has made a request for a specific portion (hereinafter "UE-config-info") of DL data scheduling/transmission related information/parameters (preferred in UE aspect) to a BS in advance, 2) the BS can transmit the remaining DL grant DCI and a corresponding DL data to the UE based on the UE-config-info. The UE-config-info may include SF (set) information preferred for DL data scheduling/transmission (in UE aspect) (or information corresponding thereto) and/or (coarse) RA information (and/or MCS information) preferred in aspect of DL data reception.

Figure 12:
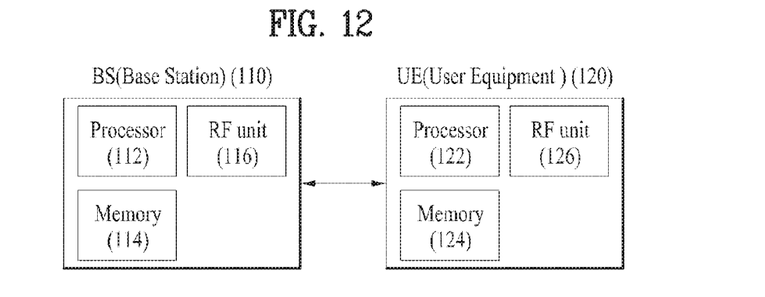
FIG. 12 illustrates a base station and a user equipment applicable to an embodiment of the present invention.

FIG. 12 illustrates a BS and a UE of a wireless communication system, which are applicable to embodiments of the present invention.

Referring to FIG. 12, the wireless communication system includes a BS 110 and a UE 120. When the wireless communication system includes a relay, the BS or UE can be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention mentioned in the foregoing description may be applicable to various kinds of mobile communication systems.

What is claimed is:

1. A method of transmitting an uplink signal to a base station by a user equipment in a wireless communication system, the method comprising:
   receiving first uplink resource allocation information from the base station wherein the first uplink resource comprises information indicating a subframe set and TPC (Transport Power Control) range indication information;
   transmitting second uplink resource allocation information to the base station wherein the second uplink resource allocation information comprises a TPC value selected by the user equipment in a TPC range determined based on the TPC range indication information; and
   transmitting uplink data within the subframe set to the base station,
   wherein transmission power of the uplink data is set based on the TPC value,
   wherein the subframe set comprises a plurality of subframe groups, and
   wherein the TPC range is changed by subframe group units according to a predefined pattern.

2. The method of claim 1, wherein the first uplink resource allocation information further comprises CS (Cyclic Shift) indication information for transmission of a reference signal used for demodulation of the uplink data and wherein the second uplink resource allocation information further comprises an MCS (Modulation and Coding Scheme) index and a TBS (Transport Block Size) index selected by the user equipment.

3. The method of claim 1, wherein the uplink resource allocation information further comprises an MCS index and wherein the second uplink resource allocation information further comprises a TBS index selected by the user equipment.

4. The method of claim 3, wherein the first uplink resource allocation information further comprises TBS range indication information and
   wherein the TBS index within the second uplink resource allocation information is selected by the user equipment in a TBS range determined based on the indication information.

5. The method of claim 1, wherein the first uplink resource allocation information is transmitted through either a PDCCH (Physical Downlink Control Channel) or a PDSCH (Physical Downlink Shared Channel) and
   wherein the second uplink resource allocation information is transmitted through either a PUCCH (Physical Uplink Control Channel) or a PUSCH (Physical Uplink Shared Channel).

6. A user equipment configured to transmit an uplink signal to a base station in a wireless communication system, the user equipment comprising:
   an RF (Radio Frequency) module; and
   a processor configured to receive first uplink resource allocation information from the base station,
   wherein the first uplink resource comprises information indicating a subframe set and TPC (Transport Power Control) range indication information,
   the processor configured to transmit second uplink resource allocation information to the base station,
   wherein the second uplink resource allocation information comprises a TPC value selected by the user equipment in a TPC range determined based on the TPC range indication information,
   the processor configured to transmit uplink data within the subframe set to the base station,
   wherein transmission power of the uplink data is set based on the TPC value,
   wherein the subframe set comprises a plurality of subframe groups, and
   wherein the TPC range is changed by subframe group units according to a predefined pattern.

7. The user equipment of claim 6, wherein the first uplink resource allocation information further comprises CS (Cyclic Shift) indication information for transmission of a reference signal used for demodulation of the uplink data and
   wherein the second uplink resource allocation information further comprises an MCS (Modulation and Coding Scheme) index and a TBS (Transport Block Size) index selected by the user equipment.

8. The user equipment of claim 6, wherein the uplink resource allocation information further comprises an MCS index and wherein the second uplink resource allocation information further comprises a TBS index selected by the user equipment.

9. The user equipment of claim 8, wherein the first uplink resource allocation information further comprises TBS range indication information and
   wherein the TBS index within the second uplink resource allocation information is selected by the user equipment in a TBS range determined based on the indication information.

10. The user equipment of claim 6, wherein the first uplink resource allocation information is transmitted through either a PDCCH (Physical Downlink Control Channel) or a PDSCH (Physical Downlink Shared Channel) and
    wherein the second uplink resource allocation information is transmitted through either a PUCCH (Physical Uplink Control Channel) or a PUSCH (Physical Uplink Shared Channel).

* * * * *